(12) United States Patent
Kirk et al.

(10) Patent No.: US 10,325,282 B2
(45) Date of Patent: Jun. 18, 2019

(54) DYNAMIC MACHINE-READABLE CODES

(71) Applicant: AT&T Intellectual Property I, L.P., Atlanta, GA (US)

(72) Inventors: Thomas Kirk, Califon, CA (US); Thomas J. Killian, Westfield, NJ (US); Christopher W. Rice, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 661 days.

(21) Appl. No.: 14/092,839

(22) Filed: Nov. 27, 2013

(65) Prior Publication Data

US 2015/0149276 A1    May 28, 2015

(51) Int. Cl.
    *G06Q 30/02*      (2012.01)
    *H04L 9/08*       (2006.01)

(52) U.S. Cl.
    CPC ....... *G06Q 30/0246* (2013.01); *H04L 9/0816* (2013.01)

(58) Field of Classification Search
CPC combination set(s) only.
See application file for complete search history.

(56) References Cited

U.S. PATENT DOCUMENTS

| | | | |
|---|---|---|---|
| 8,010,408 B2 | 8/2011 | Rubinstein et al. | |
| 8,186,572 B2 | 5/2012 | Herzig | |
| 2009/0210526 A1* | 8/2009 | Howell | H04L 29/12811 709/224 |
| 2009/0313136 A1* | 12/2009 | Giblin | G06F 17/30876 705/26.1 |
| 2010/0116888 A1 | 5/2010 | Asami | |
| 2011/0035284 A1* | 2/2011 | Moshfeghi | G06Q 30/02 705/14.58 |
| 2011/0137706 A1* | 6/2011 | Howard | G06Q 30/02 705/7.29 |
| 2011/0313870 A1* | 12/2011 | Eicher | G06Q 20/20 705/16 |
| 2012/0234907 A1 | 9/2012 | Clark et al. | |

(Continued)

FOREIGN PATENT DOCUMENTS

JP     2007280290 A     10/2007

OTHER PUBLICATIONS

Marketing Initiatives using QR codes, John Larkin (Year: 2010).*
Rivers, Damian J. "Utilizing the quick response (QR) code within a Japanese EFL environment." *The Jaltcalljournal* (2009): 15-28.

*Primary Examiner* — David J Stoltenberg
*Assistant Examiner* — Gautam Ubale

(57) ABSTRACT

A method for determining a condition under which a sign has been viewed includes receiving a uniform resource locator from a user endpoint device, where the uniform resource locator is embedded in a machine-readable code displayed on the sign, and extracting information from the uniform resource locator, where the information describes the condition under which the sign was viewed by a user of the user endpoint device. A method for transmitting information describing a condition under which a sign is currently viewable includes generating the information describing the condition under which the sign is currently viewable and inserting the information in a uniform resource locator, where the uniform resource locator is embedded in a machine-readable code displayed on the sign.

11 Claims, 4 Drawing Sheets

(56) References Cited

U.S. PATENT DOCUMENTS

| | | |
|---|---|---|
| 2013/0035787 A1 | 2/2013 | Canter |
| 2013/0048707 A1 | 2/2013 | Do |
| 2013/0048723 A1 | 2/2013 | King |
| 2013/0125200 A1 | 5/2013 | Sharma |
| 2013/0157760 A1 | 6/2013 | Boudville |
| 2013/0256402 A1* | 10/2013 | Lim ........................ G06Q 30/02 235/375 |
| 2014/0040628 A1* | 2/2014 | Fort ........................ G06F 21/34 713/182 |
| 2014/0067787 A1* | 3/2014 | Normile ............ G06F 17/30899 707/709 |
| 2014/0068593 A1* | 3/2014 | McErlane ................. G06F 8/61 717/171 |
| 2014/0110468 A1* | 4/2014 | Kandregula ....... G06Q 30/0241 235/375 |

\* cited by examiner

DYNAMIC MACHINE-READABLE CODES

BACKGROUND

Hundreds of billions of dollars are spent on advertising each year in the United States alone; as such, the ability to gauge the effectiveness of advertising is critical. However signage, which is a particularly popular form of advertising, is problematic in this regard. Although signage clearly is visible to many people, it is difficult to determine exactly how many people have viewed it, or how influential the signage is on the behavior of the viewers.

SUMMARY

A method, computer readable storage device, and apparatus for determining a condition under which a sign has been viewed includes receiving a uniform resource locator from a user endpoint device, where the uniform resource locator is embedded in a machine-readable code displayed on the sign, and extracting information from the uniform resource locator, where the information describes the condition under which the sign was viewed by a user of the user endpoint device.

A method, computer readable storage device, and apparatus for transmitting information describing a condition under which a sign is currently viewable includes generating the information describing the condition under which the sign is currently viewable and inserting the information in a uniform resource locator, where the uniform resource locator is embedded in a machine-readable code displayed on the sign.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to digital signage and relates more particularly to machine-readable codes for inclusion in digital signage. In one embodiment, the present disclosure describes a method, computer-readable storage device and apparatus for using dynamic machine-readable codes in digital signage. By "dynamic," it is meant that certain properties of the machine-readable codes change, e.g., with time or location. In one particular embodiment, a uniform resource locator (URL) embedded in a machine-readable code allows one to determine a condition (e.g., the time and/or place) under which the code was scanned by a user endpoint device, without having to extract data from the user endpoint device. From this, a condition under which the sign was viewed can be inferred. In further embodiments, additional contextually-relevant information may be embedded in the code.

Figure 1:
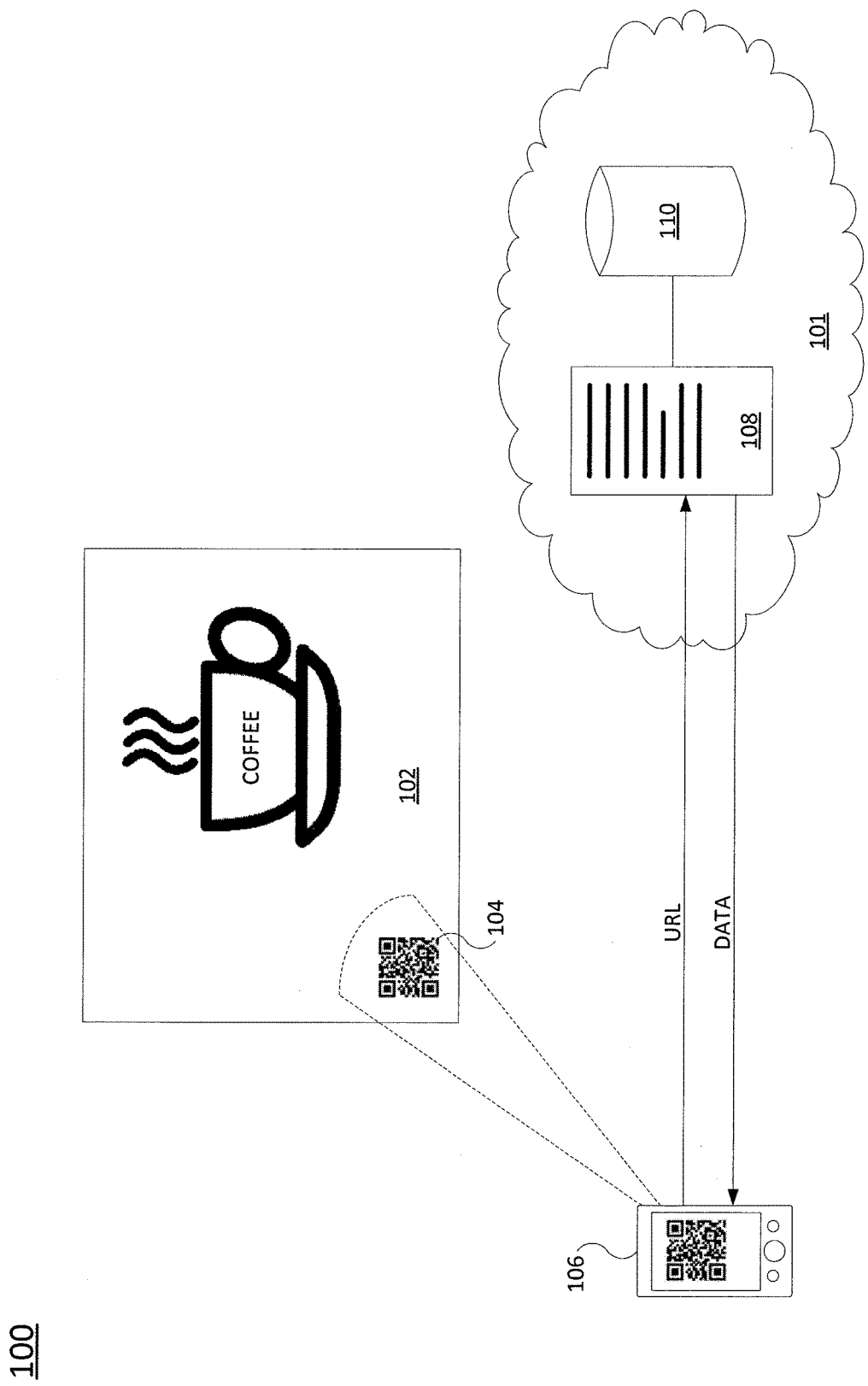
FIG. 1 is a block diagram depicting one example of a system for utilizing dynamic machine readable codes.

FIG. 1 is a block diagram depicting one example of a system 100 for utilizing dynamic machine-readable codes. The system 100 generally comprises a sign 102, a user endpoint device 106, an application server (AS) 108, and a database (DB) 110.

In one embodiment, server 108, and database 110 are deployed in a communications network 101. For example, the communication network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G/LTE and the like), and the like related to the current disclosure. It should be noted that an IP network is broadly defined as a network that uses Internet Protocol to exchange data packets.

Figure 4:
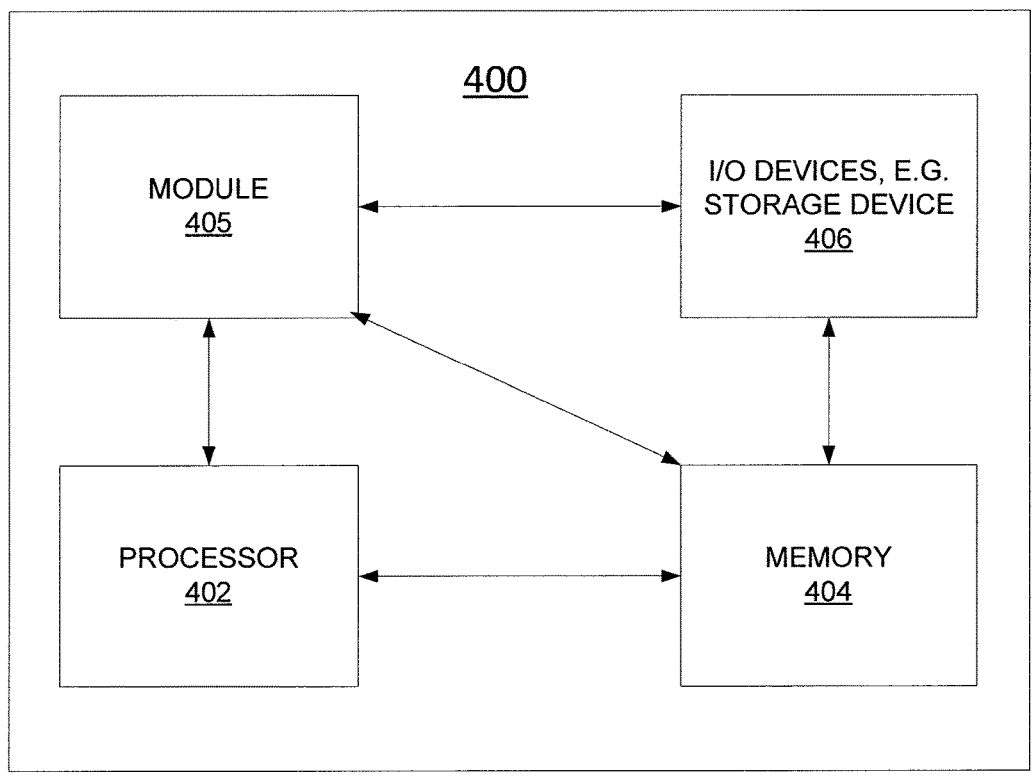
FIG. 4 depicts a high-level block diagram of a general-purpose computer suitable for use in performing the functions described herein.

In one embodiment, the communications network 101 may include a core network. The core network may include the application server (AS) 108 and the database (DB) 110. The AS 104 may be deployed as a hardware device embodied as a general purpose computer (e.g., the general purpose computer 400 as illustrated in FIG. 4). In one embodiment, the AS 104 may perform the methods and functions described herein (e.g., the methods 200 and 300 discussed below).

In one embodiment, the communications network 101 may include one or more access networks (e.g., a cellular network, a wireless network, a wireless-fidelity (Wi-Fi) network, a PSTN network, an IP network, and the like) that are not shown to simplify FIG. 1. In one embodiment, the communications network 101 in FIG. 1 is simplified and it should be noted the communications network 101 may also include additional network elements (not shown), such as for example, border elements, gateways, firewalls, routers, switches, call control elements, various application servers, and the like.

The sign 102 comprises any visible medium on which information may be displayed, such as a static billboard, a mobile billboard, a changeable copy board, an electronic message center, a poster, or the like. In one particular embodiment, the sign 102 is a digital sign, which allows for the content displayed on the sign to be easily changed. In a further embodiment still, the digital sign 102 includes a microprocessor that is capable of inserting data into a URL embedded in a machine-readable code displayed on the sign. Thus, the digital sign 102 may be implemented as a general purpose computer as illustrated in FIG. 4 and discussed below.

The sign 102 includes a machine-readable code 104. In one embodiment, the machine-readable code 104 is any type of optical machine-readable representation of data, such as a one-dimensional (i.e., linear) barcode, a two-dimensional (i.e., matrix) barcode, a quick response (QR code), or the like. As described in greater detail below, the machine-readable code 104 embeds a URL (or other character string that constitutes a reference to a resource) that allows one to determine a condition (e.g., the time and/or place) under which the machine-readable code was scanned by the user endpoint device 106. The microprocessor in the sign 102 may insert various identifying data, such as a location of the sign 102 and/or a given time of day, into the URL. The machine-readable code 104 may additionally embed other contextually relevant data.

The user endpoint device 106 may be any type of endpoint device such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. In one embodiment, the user endpoint device 106 has at least one sensor integrated therein, such as an imaging sensor (e.g., a still or video camera) or a scanner for reading machine-readable codes (e.g., a barcode scanner).

In one embodiment, the server 108 is an application server and may comprise a general purpose computer as illustrated in FIG. 4 and discussed below. In one embodiment, the server 108 may perform the methods discussed below related to determining a condition under which the machine-readable code 104 was scanned.

The database 110 may store information that allows the server 108 to decode data in the URL embedded in the machine-readable code 104. For example, the database 106 may store cryptographic keys that the server 108 shares with various signs, as discussed in greater detail below. Alternatively, the database 106 may track and store nonce strings that the server 108 distributes to different signs.

It should be noted that the system 100 has been simplified. For example, the system 100 may include various network elements (not shown) such as border elements, routers, switches, policy servers, security devices, a content distribution network (CDN) and the like that enable communication among the various pieces of the system 100.

Figure 2:
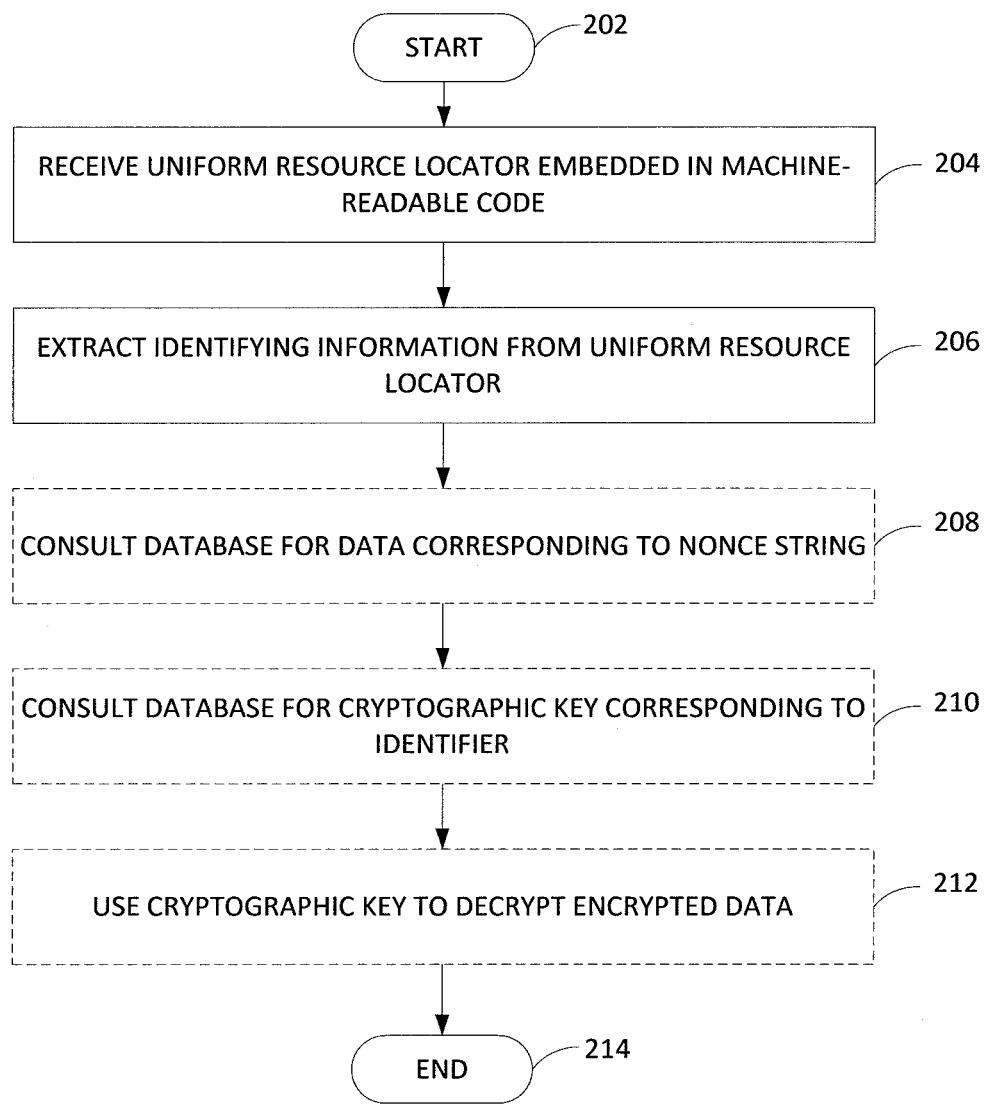
FIG. 2 illustrates a flowchart of a method for determining a condition under which a sign has been viewed.

FIG. 2 illustrates a flowchart of a method 200 for determining a condition under which a sign has been viewed. In one embodiment, the method 200 may be performed by the server 108 of FIG. 1 or a general purpose computing device as illustrated in FIG. 4 and discussed below.

The method 200 begins in step 202. In step 204, the server 108 receives a URL from the user endpoint device 106. The URL is embedded in a machine-readable code 104 that was not necessarily captured by the user endpoint device 106 at the same time that the URL is received by the server 108. That is, the user of the user endpoint device 106 may have captured an image of the machine-readable code 104, but waited to launch the embedded URL until sometime after the image was captured. For instance, the user may have captured an image of a machine-readable code 104 displayed on a roadside billboard as the user was traveling and unable to review more detailed information.

In step 206, the server 108 extracts from the URL information that describes a condition under which the sign was viewed by the user. In one embodiment, the information includes a location of the sign and/or a time at which the sign was viewed by the user of the user endpoint device 106. The location may comprise simply a unique identifier associated with the sign (e.g., a serial number), or it may comprise the actual physical location of the sign (e.g., global positioning system coordinates). The time may comprise the exact or approximate time at which the user of the user endpoint device 106 captured the image of the machine-readable code. In one embodiment, the time is only approximate because the time identifier embedded in the URL is updated at periodic intervals (e.g., every few seconds). Thus, the time may comprise a range of times between which the user of the user endpoint device 106 captured the image of the machine-readable code.

The server 108 and the microprocessor of the digital sign 102 agree on specifically how the information is represented in the URL. In one embodiment, the representation is completely transparent (e.g., the time and/or location are depicted "in the clear" in the URL). However, this approach may leave the system 100 vulnerable to fraud. Moreover, a low-resolution machine-readable code, legible from a distance, might still be able to store only a limited number of characters (e.g., fifty). Thus, in one embodiment, the information is sent "in the clear," but protected by a message authentication code (MAC). However, in an alternative embodiment, an opaque (e.g., encoded or otherwise masked) representation of the information is employed.

In an alternative embodiment, the information extracted in step 206 is a sequence of pseudo-random nonce strings. The strings are sent by the server 108 to a plurality of signs (microprocessors), each sign receiving a different string or set of strings. In this case, the server 108 consults the database 110 in optional step 208 (illustrated in phantom). The database 110 maintains a table of which strings were sent when and to which signs (microprocessors). Thus, this table may be referenced by the server 108 in step 208 for time and/or location (or other) data associated with the received URL.

In another alternative embodiment, the information extracted in step 206 is an identifier (e.g., a serial number) and a string of encrypted data. In this case, the server 108 extracts the identifier and consults the database 110 in optional step 210 (illustrated in phantom) for a shared cryptographic key (e.g., an advanced encryption standard key) corresponding to the identifier. In optional step 212 (illustrated in phantom), the server 108 uses the shared cryptographic key to decrypt the encrypted data, which includes time and/or location (or other) data associated with the received URL. Although not illustrated, this embodiment may additionally employ the use of a separately keyed MAC.

The method 200 ends in step 214.

Although the method 200 describes operations in which descriptive information is sent either "in the clear" or in an encoded form, it will be appreciated that a hybrid of these approaches could also be employed. For instance, the server 108 may periodically send the microprocessor fresh nonce and/or fresh key material, but the microprocessor may use its local clock to time-stamp the data that is inserted into the URL.

Moreover, although the method 200 references a server 108 that both functions as a web server (e.g., receives the URL) and manages the signs (e.g., distributes data for use in transmitting the URL), this does not necessarily have to be the case. For instance, a separate web server that makes no use of the descriptive information may be employed; however, the information may be extracted from the web server's logs for offline analysis.

Figure 3:
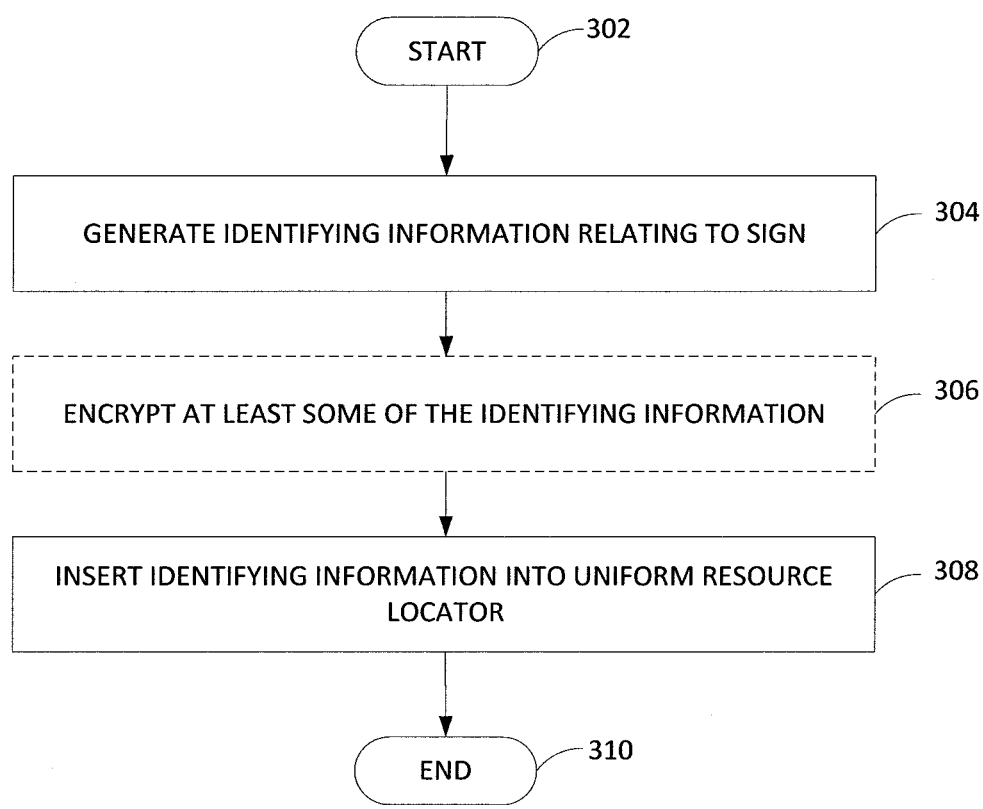
FIG. 3 is a flow diagram illustrating another embodiment of a method for determining a condition under which a sign has been viewed.

FIG. 3 is a flow diagram illustrating another embodiment of a method 300 for determining a condition under which a sign has been viewed. In one embodiment, the method 300 may be performed by a hardware processor that is part of the sign 102 of FIG. 1 or a general purpose computing device as illustrated in FIG. 4 and discussed below.

The method 300 begins in step 302. In step 304, the hardware processor generates descriptive information relating to the sign 102 (e.g., information describing a condition under which the sign is currently viewable). In one embodiment, the descriptive information includes a location of the sign and/or a current time. The location may comprise simply a unique identifier associated with the sign (e.g., a serial number), or it may comprise the actual physical location of the sign (e.g., global positioning system coordinates). The time may comprise the exact or approximate time. In one embodiment, the time is only approximate because the time identifier is updated at periodic intervals (e.g., every few seconds). Thus, information generated in step 304 may comprise an update to identifying information that was previously generated.

In one embodiment, the descriptive information comprises a unique sequence of pseudo-random nonce strings sent by the server 108 to the hardware processor. As discussed above, the server 108 is able to derive information such as a time and/or location associated with the sign 102.

In optional step 306 (illustrated in phantom), the hardware processor encrypts at least some of the descriptive information using a cryptographic key (e.g., an advanced encryption standard key) that is shared with the server 108. The encrypted data is then appended to an identifier that corresponds to the cryptographic key.

In step 308, the hardware processor inserts descriptive information (which may or may not be encoded in some fashion as described above) into a URL associated with the machine-readable code 104 that is displayed on the sign 102.

The method 300 then ends in step 310.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for determining a condition under which a sign has been viewed, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for determining a condition under which a sign has been viewed (e.g., a software program comprising computer-executable instructions) can be loaded into memory 404 and executed by hardware processor element 402 to implement the steps, functions or operations as discussed above in connection with the exemplary methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for determining a condition under which a sign has been viewed (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
providing periodically, by a processor of a server deployed in a communications network, a plurality of nonce strings to a digital sign, wherein each of the plurality of nonce strings represents a physical location of the digital sign and a time;
receiving, by the processor, a uniform resource locator from a user endpoint device, wherein the uniform resource locator is embedded in a dynamically changing optical machine-readable code displayed on the digital sign, wherein the dynamically changing optical machine-readable code is captured by the user endpoint device from the digital sign, wherein the uniform resource locator is extracted by the user endpoint device from the dynamically changing optical machine-readable code that was captured by the user endpoint device, wherein the uniform resource locator includes a nonce string of the plurality of nonce strings that was provided by the processor to the digital sign, wherein the nonce string represents a plurality of conditions under which the dynamically changing optical machine-readable code was captured by the user endpoint device, wherein the plurality of conditions comprises a physical location of the digital sign at which the dynamically changing optical machine-readable code was captured by the user endpoint device and a time at which the dynamically changing optical machine-readable code was captured by the user endpoint device;
extracting, by the processor, the nonce string from the uniform resource locator; and determining, by the processor, the plurality of conditions under which the dynamically changing optical machine-readable code was captured by the user endpoint device, wherein the determining comprises performing a lookup of the nonce string in a database table that associates the nonce string with the plurality of conditions.

2. The method of claim 1, wherein the physical location at which the dynamically changing optical machine-readable code was captured by the user endpoint device comprises a unique identifier associated with the digital sign.

3. The method of claim 1, wherein the physical location at which the dynamically changing optical machine-readable code was captured by the user endpoint device is described by a set of coordinates.

4. The method of claim 1, wherein the time at which the dynamically changing optical machine-readable code was captured by the user endpoint device comprises an exact time at which the dynamically changing optical machine-readable code was captured by the user endpoint device.

5. The method of claim 1, wherein the time at which the dynamically changing optical machine-readable code was captured by the user endpoint device comprises a range of times between which the dynamically changing optical machine-readable code was captured by the user endpoint device.

6. A non-transitory computer-readable storage device storing a plurality of instructions which, when executed by a processor of a server deployed in a communications network, cause the processor to perform operations, the operations comprising:

providing periodically a plurality of nonce strings to a digital sign, wherein each of the plurality of nonce strings represents a physical location of the digital sign and a time;

receiving a uniform resource locator from a user endpoint device, wherein the uniform resource locator is embedded in a dynamically changing optical machine-readable code displayed on the digital sign, wherein the dynamically changing optical machine-readable code is captured by the user endpoint device from the digital sign, wherein the uniform resource locator is extracted by the user endpoint device from the dynamically changing optical machine-readable code that was captured by the user endpoint device, wherein the uniform resource locator includes a nonce string of the plurality of nonce strings that was provided by the processor to the digital sign, wherein the nonce string represents a plurality of conditions under which the dynamically changing optical machine-readable code was captured by the user endpoint device, wherein the plurality of conditions comprises a physical location of the digital sign at which the dynamically changing optical machine-readable code was captured by the user endpoint device and a time at which the dynamically changing optical machine-readable code was captured by the user endpoint device;

extracting the nonce string from the uniform resource locator; and determining the plurality of conditions under which the dynamically changing optical machine-readable code was captured by the user endpoint device, wherein the determining comprises performing a lookup of the nonce string in a database table that associates the nonce string with the plurality of conditions.

7. A method comprising:

receiving periodically, by a processor of a digital sign from a server deployed in a communication network, a plurality of nonce strings, wherein each of the plurality of nonce strings represents a physical location of the digital sign and a time;

identifying, by the processor, a nonce string of the plurality of nonce strings that represents a plurality of conditions under which the digital sign is currently viewable, wherein the plurality of conditions comprises a current physical location of the digital sign and a time at the current physical location of the digital sign;

inserting, by the processor, the nonce string that is identified into a uniform resource locator;

embedding, by the processor, the uniform resource locator in a dynamically changing optical machine-readable code; and displaying, by the processor, the dynamically changing optical machine-readable code on the digital sign.

8. The non-transitory computer-readable storage device of claim 6, wherein the current physical location comprises a unique identifier associated with the digital sign.

9. The non-transitory computer-readable storage device of claim 6, wherein the current physical location is described by a set of coordinates.

10. The non-transitory computer-readable storage device of claim 6, wherein the time at the current physical location comprises an exact time.

11. The non-transitory computer-readable storage device of claim 6, wherein the time at the current physical location comprises a range of times.

* * * * *